US012782239B2

(12) United States Patent
Johnson et al.

(10) Patent No.: US 12,782,239 B2
(45) Date of Patent: Nov. 3, 2026

(54) LINEAR ACTUATOR ASSEMBLY

(71) Applicant: EMPULSE TEST SYSTEMS, LLC, Zeeland, MI (US)

(72) Inventors: Matt Johnson, Zeeland, MI (US); Doug Boals, Zeeland, MI (US)

(73) Assignee: EMPULSE TEST SYSTEMS, LLC, Zeeland, MI (US)

( * ) Notice: Subject to any disclaimer, the term of this patent is extended or adjusted under 35 U.S.C. 154(b) by 423 days.

(21) Appl. No.: 18/499,547

(22) Filed: Nov. 1, 2023

(65) Prior Publication Data

US 2024/0151611 A1 May 9, 2024

Related U.S. Application Data

(60) Provisional application No. 63/422,537, filed on Nov. 4, 2022.

(51) Int. Cl.
*G01M 17/04* (2006.01)
*H02K 41/03* (2006.01)

(52) U.S. Cl.
CPC .......... *G01M 17/04* (2013.01); *H02K 41/031* (2013.01)

(58) Field of Classification Search
CPC .......................... G01M 17/04; G01M 17/0078
See application file for complete search history.

(56) References Cited

U.S. PATENT DOCUMENTS

| | | | |
|---|---|---|---|
| 5,134,335 | A | 7/1992 | Ikemoto et al. |
| 7,538,456 | B2 | 5/2009 | Miyamoto et al. |
| 8,723,375 | B2 | 5/2014 | Hiura et al. |
| 9,124,154 | B2 | 9/2015 | Hochberg et al. |
| 9,197,113 | B2 | 11/2015 | Kakiuchi et al. |
| 2006/0214753 | A1 | 9/2006 | Yamada et al. |
| 2009/0146507 | A1 | 6/2009 | Teramachi et al. |
| 2017/0070131 | A1 | 3/2017 | Degner et al. |
| 2019/0207502 | A1 | 7/2019 | Ishizaka |

FOREIGN PATENT DOCUMENTS

| | | | | |
|---|---|---|---|---|
| EP | 1626483 | A1 | 2/2006 | |
| EP | 2320543 | A2 * | 5/2011 | ........... H02K 41/031 |
| EP | 2621067 | B1 | 6/2018 | |
| EP | 3422544 | A1 | 1/2019 | |
| EP | 3629450 | A1 | 4/2020 | |
| WO | 2015070869 | A2 | 5/2015 | |

* cited by examiner

*Primary Examiner* — Walter L Lindsay, Jr.
*Assistant Examiner* — Andrew V Do
(74) *Attorney, Agent, or Firm* — Young Basile Hanlon & MacFarlane, P.C.

(57) ABSTRACT

A linear actuator assembly having: an actuator frame; an armature located within the actuator frame; magnets comprising: a magnetic material that generates a magnetic field, the magnetic material comprising a magnetic material thickness, and magnetic backing connected to the magnetic material comprising a magnetic backing thickness, wherein the magnets comprise: one or more first magnets connected to the first side of the armature, and one or more second magnets connected to the second side of the armature; a linear motor located on the armature and spaced apart from the first magnets by a first air gap; and a second linear motor located on the armature and spaced apart from the second magnets by a second air gap; and wherein the magnetic backing thickness is less than the magnetic material thickness; and wherein the armature, the first magnets, and the second magnets are moved relative to the actuator frame.

20 Claims, 10 Drawing Sheets

LINEAR ACTUATOR ASSEMBLY

CROSS REFERENCE TO RELATED APPLICATIONS

This application claims priority to U.S. Patent Application No. 63/422,537, filed on Nov. 4, 2022, the contents of which are incorporated by reference herein in the entirety.

FIELD

The present teachings to a linear actuator assembly that is a high-speed servo electric actuator.

BACKGROUND

Vehicle stability and durability are tested in many different ways. Some vehicle testing is performed by driving a vehicle outside while sensors are connected to the vehicle and then later reviewing the sensor data to determine how the vehicle responds to the outside conditions. Additionally, some vehicles are tested in laboratories so that sensor data may be reviewed in real time. These laboratory tests may be performed by allowing the tires to rotate while the vehicle remains stationary. Other laboratory tests may be performed by moving one or more corners of the vehicle. However, these test equipment may not move fast enough or generate enough force to simulate real world movement. Moreover, with electric vehicles on the rise weight distributions in the corners of a vehicle may be different than those of a gasoline vehicle.

Thus, there is a need for a linear actuator assembly that simulates driving conditions or vibration conditions. There is a need for a high-speed linear actuator. What is needed is a linear actuator assembly that lifts the car a predetermined height off of the ground and then a motor that simulates road conditions. There is a need for an assembly that provides a sufficient amount of force that a pothole or bump is simulated in the laboratory setting. What is needed is a linear actuator that is capable of lifting an moving electric vehicles and the additional weight of the electric vehicles relative to gasoline vehicles.

SUMMARY

The present teachings provide: a linear actuator assembly comprising: an actuator frame; an armature located within the actuator frame, the armature having a first side and a second side; magnets comprising: a magnetic material that generates a magnetic field, the magnetic material comprising a magnetic material thickness, and magnetic backing connected to the magnetic material, the magnetic backing comprising a magnetic backing thickness, wherein the magnets further comprise: one or more first magnets connected to the first side of the armature, and one or more second magnets connected to the second side of the armature; a first linear motor located on the first side of the armature and spaced apart from the one or more first magnets by a first air gap; and a second linear motor located on the second side of the armature and spaced apart from the one or more second magnets by a second air gap; and wherein ratio of the magnetic backing thickness to the magnetic material thickness is about 2:1 or less; and wherein the armature, the one or more first magnets, and the one or more second magnets are moved relative to the actuator frame by the first linear motor and the second linear motor.

The present teachings provide: a linear actuator assembly comprising: an actuator frame; an armature located within the actuator frame, the armature comprising: a first side; a second side; and one or more voids having a cross-sectional thickness; a first linear motor connected to the first side of the armature; a second linear motor connected to the second side of the armature; and a lifting assembly located within the one or more voids, the lifting assembly comprising: an air tank, and an air bag connected to and located axially above the air tank, wherein the air bag movably fits within the one or more voids and the air bag has a cross-sectional thickness that is substantially equal to the cross-sectional thickness of the one or more voids.

The present teachings provide a linear actuator assembly that simulates driving conditions. The present teachings provide a high-speed linear actuator. The present teachings provide an assembly that provides a sufficient amount of force that a pothole or bump is simulated in the laboratory setting. The present teachings provide a linear actuator assembly that lifts the car a predetermined height off of the ground and then a motor that simulates road conditions. The present teachings provide a linear actuator that is capable of lifting an moving electric vehicles and the additional weight of the electric vehicles relative to gasoline vehicles.

DETAILED DESCRIPTION

Figure 1A:
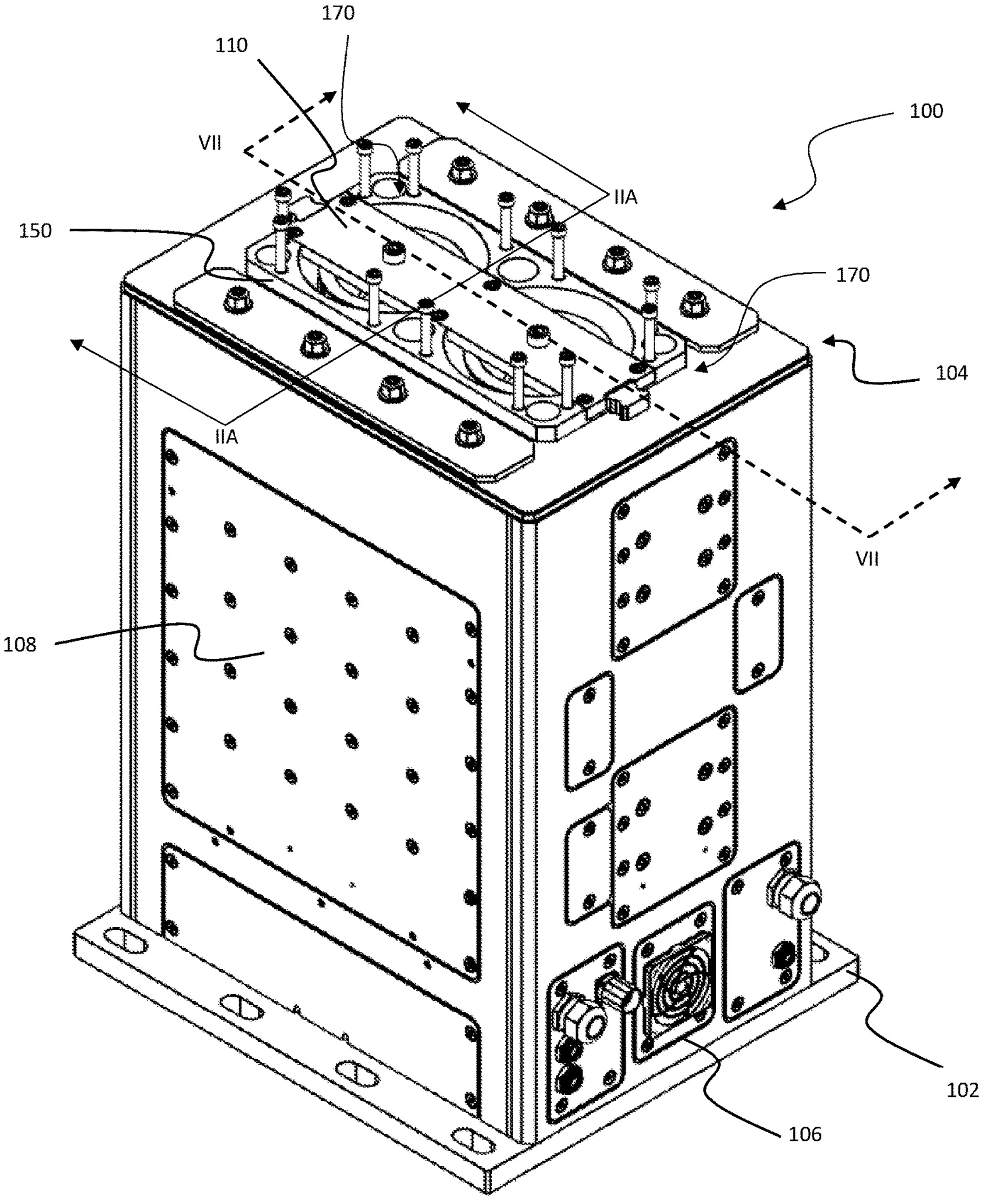
FIG. 1A is an isometric view of a first side of a linear actuator assembly.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The linear actuator assembly functions to move objects along an axis. The linear actuator assembly functions to move a tire, a corner of a vehicle, test objections, or a combination thereof. The linear actuator assembly may move up and down a predetermined distance, varying distances, in a pattern of distances, along an axis, or a combination thereof. The linear actuator assembly may mimic bumps, potholes, a gravel road, or a combination thereof. The linear actuator may move rapidly so that the tire bounced. The linear actuator assembly may vibrate objects for NVH testing. The linear actuator assembly may actuate about 20 or more times per minute, about 40 or more times per minute, about 60 or more times per minute, or even about 100 or more times per minute. The linear actuator assembly may actuate about 1000 times per minute or less, about 750 times per minute or less, 500 times per minute or less, or about 250 times per minute or less. The linear actuator assembly may actuate 1 time or more per second, 3 times or more per second, 5 times or more per second, or 7 times or more per second. The linear actuator assembly may actuate 20 times or less per second, 15 times or less per second, or about 10 times or less per second. The actuation rate may be dependent upon the distance traveled. For example, the linear actuator assembly may move 2 m/s or 30 cycles per second. However, if distance is decreased cycle times may increase linearly or non-linearly. For example, if the stroke length is moved to 1 meter then the cycle time may move to 60 cycles per second (linear) or 100 cycles per second (non-linear).

The linear actuator assembly may actuate a distance of about 7 cm or more, about 10 cm or more, about 12 cm or more, about 15 cm or more, or even about 20 cm or more. The linear actuator assembly may actuate a distance of about 4 m or less, about 3.5 m or less, about 3 m or less, or about 2.5 m or less. The linear actuator assembly may have a base portion that remains static and a lifting portion that moves relative to the base portion.

The base portion functions to connect the linear actuator assembly to a floor, a foundation, a frame, an immobile member, or a combination thereof. The base portion may be connected by bolts, screws, welding, set in concrete, or a combination thereof. The base portion may be made of or include concrete, metal, steel, stainless steel, carbon fiber, or a combination thereof. The base portion may be made of a rigid material so that the base portion is free of movement, twisting, bending, or a combination thereof when the linear actuator assembly is actuated. The base portion may form all or a portion of an exterior of the linear actuator assembly. The base portion may connect to a surface and extend upward from the surface. The base portion may house all or a portion of the lifting portion.

The lifting portion functions to move relative to the base portion to move an object. The lifting portion function may lift a corner of a vehicle. The lifting portion may function to provide an axial force to a tire of a vehicle so that a shock or strut of the vehicle is moved. The lifting portion may axially move out of a base portion. The lifting portion may include one or more portions that move. The lifting portion may move a weight of about 250 Kg or more, about 400 Kg or more, about 500 Kg or more, about 750 Kg or more, or about 1,000 Kg or more. The lifting portion may move a weight of about 5,000 Kg or less or about 4,000 Kg or less. The lifting portions may be cooled through one or more vent holes.

The vent holes may extend through the base portion. The vent holes may be a through hole. The vent holes may passively cool the linear actuator assembly. The vent holes may simply permit air to pass into the linear actuator assembly. The vent holes may actively cool the linear actuator assembly. The vent holes may include a fan or a pump. The vent holes may permit air to move into the linear actuator assembly. The vent holes may permit a fluid to pass into the linear actuator assembly. The vent holes may permit a liquid such as water to extend into the linear actuator assembly. The vent holes may be located on one or more sides. The vent holes may be located above a bottom of the base portion. The vent holes may be located on an opposite end of the linear actuator assembly as the lifting plate.

The lifting plate may function to connect the linear actuator assembly to an object to be moved. The lifting plate may be a top of the linear actuator assembly or linear actuator assemblies, the lifting portion, or both. The lifting plate may assist in connecting the lifting portion to an object, a corner, a strut, a shock, a wheel, or a combination thereof. The lifting plate may be a top of the base portion and the lifting portion may extend through the lifting plate. The one or more air bags axially move the lifting plate to distribute a load therebetween. The lifting plate may be moved by one or more linear motors.

The linear motors may move the lifting portion along an axis. The linear motors may be connected to the actuator frame by a connection with a mounting plate or a motor mount plate. The motor mounting plate may extend into the actuator frame from a first side and connect to the linear motor on a second side of the actuator frame. The connection between the first side and the second side may form the connection with the actuator frame. Fasteners may extend through the mounting plate into the linear motor. The mounting plate may fix the linear motor to the actuator frame. The mounting plate and a connection between the mounting plate and the actuator frame may prevent movement of the linear motor when the linear motor is actuated.

The linear motors may move the lifting portion in a single direction, move the lifting portion linearly, move the lifting portion in a z-direction, or a combination thereof. The linear motors may be fixedly connected to the base portion so that the linear motors move or are movable. One or more linear motors may be located on a first side and one or more linear motors may be located on a second side of the linear actuator assembly. Thus, each linear actuator assembly may include two or more linear motors or four or more linear motors. The linear motors may sandwich the lifting portion so that the lifting portion is moved by the linear motors. The linear motors may be static and another part may move relative to the linear motors. The linear motors when powered may generate a magnetic field. The linear motors may provide dynamic movement of the armature, the corner of the vehicle, or both. The linear motors may move a distance. The distance may be about 5 cm or more, about 10 cm or more, about 15 cm or more, or about 20 cm or more. The distance may be about 100 cm or less, about 75 cm or less, about 50 cm or less, or about 30 cm or less. The linear motors may include a plurality of windings. The linear motors may be spaced apart from magnets by an air gap.

The air gap may be a space between two components of the linear actuator assembly. The air gap may be a space between the linear motors and the magnets. The air gap may prevent direct contact between the linear motors and the magnets. The air gap may be large enough to prevent contact between parts but small enough to allow an electromagnetic field or a magnetic field to pass through the air gap. The air gap may a distance of about 0.1 mm or more, about 0.5 mm or more, about 1 mm or more, or about 2 mm or more. The air gap may have a distance of about 1 cm or less, about 0.7 mm or less, or about 0.5 mm or less. The air gap may permit an electric field to pass from the linear motors to magnets.

The magnets may be spaced apart from the linear motors by the air gap. The magnets may be connected to the lifting portion or be part of the lifting portion. The magnets may be repelled by the linear motors when the linear motors are turned on. The magnets may move with the lifting portion, move the lifting portion, or both. The magnets may move relative to a motor portion. The motor may be static and the magnets may move. The magnets may include one or more parts. The magnets may include a magnetic material and a backing material.

The magnetic material may be made of any magnetic material. The magnets may be made of or include a ferrous material, iron, nickel, cobalt, a rare earth metal, neodymium, samarium cobalt, or a combination thereof. The magnetic material may be sufficiently strong to move a corner of a vehicle, move the weights discussed herein, or a combination thereof. The magnets may produce a magnetic field or be moved by a magnetic field. The magnets may be repelled by the magnetic field. The magnetic material has a thickness. The thickness of the magnetic material may be about 4 mm or more, about 5 mm or more, about 5.7 mm or more, about 6 mm or more, or about 7 mm or more. The thickness of the magnetic material may be about 20 mm or less, about 15 mm or less, or about 10 mm or more. The magnets may be supported by a magnetic backing. The magnetic field of the magnets may be partially of completely blocked by a magnetic backing (e.g., a magnetic mounting plate).

The magnetic backing functions to provide rigidity to the magnets. The magnetic backing functions to assist the magnet and/or magnetic material to be connected to a structure. The magnetic backing may be rigid. The magnetic backing may be made of an insulator material. The magnetic backing may have some magnetic properties. The magnetic backing may be free of magnetic properties. The magnetic backing may be metal. The magnetic backing may be ferrous. The magnetic backing may be made of aluminum. The magnetic backing may bonded to the magnetic material to form a magnet. The magnetic backing may be substantially a same size as the magnetic material. For example, an area of the magnetic material and the magnetic backing may be substantially identical. The length and width of the magnetic material and the magnetic backing may be the same. The magnetic material has a thickness. The magnetic backing may be sufficiently thick to provide magnetic saturation. The magnetic backing may have a thickness of about 6 mm or more, about 7 mm or more, about 8 mm or more, or about 9 mm or more. The magnetic backing may have a thickness of about 12.5 mm or less, about 12.4 mm or less, about 10 mm or less, about 9 mm or less, about 8 mm or less, or about 7.5 mm or less (e.g., ±0.5 mm). The magnetic material and the magnetic backing may have a ratio of thickness. The ratio of thicknesses between the magnetic backing thickness and the magnetic material thickness may be about 2:1 or less, about 1.8:1 or less, about 1:6 or less, or about 1:1.4 or less. The ratio of thicknesses between the magnetic backing thickness and the magnetic material thickness may be about 0.5:1 or more, about 0.7:1 or more, about 1:1, about 1.2:1 or more, about 1.3:1 or more, or about 1.4:1 or more. The magnetic backing may be connected to an armature.

The armature may function to move or be moved. The armature may be axially stiff. The armature may be part of the lifting portion. The armature may be moved by the magnets. The armature may move with the magnets. The armature may provide stiffness to the magnets. The armature may protect the magnets when the magnets are connected to the armature. The armature may be a structurally rigid part of the lifting portion. The armature may be a rigid part that moves within the linear actuator assembly, move a corner of a vehicle, or both. The armature may include one or more voids therein.

The voids may function to receive one or more internal components of the linear actuator assembly. The voids may include one or more lifting assemblies. The one or more voids may be a through hole in the armature. The voids may extend through a central portion of the armature. The one or more voids may extend all of the way through the armature. The one or more voids may be equally spaced apart. The one or more voids may be symmetrically located within armature (e.g., relative to a length, width, height). The voids may be large enough to fit an entire lifting assembly within a void. Each void may include substantially an entire lifting assembly. Thus, if the armature includes two voids each void may include one complete lifting assembly. The voids may have a cross sectional thickness. The cross-sectional thickness (e.g., diameter) may be about 0.5 cm or more, 1 cm or more, 2 cm or more, 3 cm or more, about 5 cm or more, or about 10 cm or more. The cross-sectional thickness may be about 50 cm or less, about 40 cm or less, about 30 cm or less, or about 20 cm or less. The voids may extend parallel to one or more travel stops, one or more bearing rails, one or more windows, or a combination thereof.

The travel stops function to provide a maximum movement distance of the armature. The travel stops may restrict movement in a first direction, a second direction, or both (e.g., up and down). The travel stops may receive a part of the base portion, a part of the actuator frame or both. The armature during normal movement may move and the travel stops may be substantially free of being contacted. The travel stops may be an aperture that extends a predetermined distance. The predetermined distance may be a maximum travel distance of the armature. A length of the travel stops may extend about 10 percent or more, 20 percent or more, 30 percent or more, 40 percent or more, or 50 percent or more an overall length of the armature. A length of the travel stops may extend about 100 percent or less, 90 percent or less, 80 percent or less, 70 percent or less, or 60 percent or less an overall length of the armature. The travel stop may only stop at a first end (e.g., a bottom) and a second end (e.g., a top end). The travel stop may be a single elongated aperture. The travel stop may include smaller holes within the aperture. The aperture may set a maximum travel distance and the holes may lock the armature at a location. A portion of the actuator frame may be extended into the holes to lock the armature at a location. A pin or separate device may extend through the actuator frame and a hole to lock the armature in place.

The one or more travel stops may extend along two or more sides. The travel stops may extend along two opposing sides of the armature. The travel stops may be located side by side on a first side of the armature and side by side on a second side that is opposite the first side. Thus, two travel stops may be on a first side and two travel stops may be on a second side. The two travel stops may sandwich a bearing rail there between.

The bearing rails function to permit movement of the armature, guide the armature, prevent movement of the armature in only a single direction, or a combination thereof. The bearing rails may connect to a track of the actuator frame so that the actuator frame guides the armature in a direction of interest. The bearing rails may permit movement of the armature relative to the actuator frame. The bearing rails may resist movement of the armature in any direction other than a linear direction. The bearing rails may prevent the armature from moving in any direction other than an axial direction. The bearing rails may act to guide the armature. The bearing rails may only allow the armature to move in a single direction. The bearing rails may be a monolithic part of the armature. The bearing rails may be formed in the armature. Bearing rails may be located on opposing sides of the armature. The bearing rails may house one or more bearings or rolling devices. The bearing rails may contain ball bearings, cylinder bearings, a metal moving material, a plastic material, or a combination thereof. The bearing rails may be complementary in shape to the actuator frame. The bearing rails may be located on adjacent surfaces as windows of the armature.

The windows may function to remove weight from the armature, allow cooling of the armature, allow cooling of components located within the armature, provide flexibility in predetermined regions, remove mass in regions with a low or no strain or torque, or a combination thereof. The windows may be an absence of material from locations where structural support is not needed. Material may be removed from one region forming a window and added to another region around the window. The windows may be a through hole. The windows may be a depression in the armature. The windows may be located symmetrically, asymmetrically, in a pattern, randomly, or a combination thereof. The windows may be located on one or more surfaces, two or more surfaces, three or more surfaces, four or more surfaces, or all of the surfaces. The windows may all be a same size and shape. The windows may vary in size and shape. The windows may be geometric, non-geometric, square, round oval, circular triangular, stadium, or a combination thereof. The windows may be located within the bearing rails, adjacent the bearing rails or both. The windows may be located above one or more ears.

The ears may function to at least temporarily connect the armature to a base portion. The ears may extend into the base portion when the armature is at rest or at an initial position. The ears may extend beyond a bottom of the armature or be a portion of the armature that protrudes outward. The ears may prevent rotation of an armature. The ears may prevent movement of an armature relative to a surface, a base portion, or both. The ears may removably form connections with the base portions. For example, the armature may move relative to the base portion so that the ears may move in and out of the base portion. The ears may be a monolithic part of the armature. The ears may be an extension of the bearing rail. The ears may extend parallel to one or more voids in the armature. A top of each void may be covered by lifting plate and adjacent to a connecting plate.

The connection plate may fix a top of the base portion to a body of the base portion. The connection plates may lock a top of the base portion to a body of the base portion. The connection plates may provide rotational stability to the base portion, provide axial stability, lateral stability, longitudinal stability, or a combination thereof. The connection plates may run along opposing sides of the lifting portion, the armature, or both. The connection plates may connect to the actuator frame of the base portion.

The actuator frame may be a body of the base portion. The actuator frame may be an external shell. The actuator frame may be a housing. The actuator frame may be a central part that the other components connect to. The actuator frame and base portion may fixedly connect to a structure to prevent movement of the linear actuator assembly. The base portion may be made of include a polymer, a metal, steel, aluminum, carbon fiber, titanium, stainless steel, carbon steel, or a combination thereof. The actuator frame may be sufficiently rigid so that the linear actuator assembly is free of movement during lifting. The actuator frame may be generally square or rectangular. The actuator frame may include two or more sides, three or more sides, or four or more sides.

The sides of the actuator frame may extend longitudinally (e.g., upward or in the axial movement direction of the lifting portion). Two sides of the actuator frame may be connected to linear motors. The sides of the actuator frame may be planar. The sides may be a front, back, left, right, or a combination thereof. The sides may be a first side, a second side, a third side, a fourth side, or a combination thereof. The sides of the actuator frame may create a structure that houses an armature, a lifting assembly, or both.

The lifting assemblies function to move an armature relative to the actuator frame. The lifting assemblies may lift an armature a first distance. The lifting assembly may lift an armature and a corner of a vehicle or a portion of a vehicle a first distance. The lifting assembly may generate a first lifting distance before a linear motor moves the armature a second distance. The lifting assemblies may carry a static load. The lifting assemblies may lift the armature the first distance and maintain the armature at that location and then the linear motors may dynamically move the armature. The lifting assemblies may create a stop or a soft stop of the armature. The lifting assemblies may prevent the armature from contacting the base portion when the lifting assemblies are actuated. The lifting assemblies may have a cross-sectional thickness (e.g., diameter). The cross-sectional thickness (e.g., diameter) of the lifting assemblies may be about 0.5 cm or more, 1 cm or more, 2 cm or more, 3 cm or more, about 5 cm or more, or about 10 cm or more (e.g., ±0.5 mm). The cross-sectional thickness may be about 50 cm or less, about 40 cm or less, about 30 cm or less, or about 20 cm or less (e.g., ±0.5 mm). The void cross-sectional thickness and the lifting assembly cross-sectional thickness may have a ratio. The ratio of cross-sectional thicknesses of the void to the lifting assembly may be about 1.1:1 or less, about 1.05:1 or less, about 1.01:1 or less, about 1.005:1 or less, or about 1.001:1 or less. The ratio of cross-sectional thicknesses of the void to the lifting assembly may be about 1.00001:1 or more, about 1.00005:1 or more, about 1.0001:1 or more, or about 1.005:1 or more. The cross-sectional thickness of the void and the lifting assembly may be substantially equal (e.g., within about 0.001 mm or less). The linear actuator assembly may include one or more, two or more, three or more, or even four or more lifting assemblies. The lifting assemblies may include one or more air bags.

The air bags function to lift the armature and associated portion of a vehicle or a test object a predetermined distance. The air bag functions to hold the armature and the associated portion of a vehicle at the predetermined distance. The air bag may function as a stop. The air bag may prevent the armature from moving below a predetermined distance when the linear motor stops lifting or moves the armature in a second distance. The air bags may lift about 250 Kg or more, about 500 Kg or more, about 750 Kg, or more, about 1000 Kg or more, or about 1500 Kg or more. The air bags may fit within voids within the armature. The air bags may substantially fill the voids. The air bags may move axially within the voids (e.g., a longitudinal axis). For example, the voids may have a cross-sectional thickness (e.g., diameter) and the air bags may have a cross-sectional thickness that are within about 0.5 mm or less, about 0.25 mm or less, about 0.1 mm or less, or about 0.05 mm or less (±0.05 mm). Each void (e.g., 2 voids) may include an air bag. The air bag enlarges in an axial direction when a fluid is introduced into the air bag and the cross-sectional thickness remains substantially constant. The air bags of the lifting assemblies may enlarge in an axial direction and maintain a substantially constant cross-sectional thickness. The air bags may be in communication with an air tank.

The air tank functions to supply fluid to the air bags. The air tanks may generate a pressurized fluid, store a pressurized fluid, or both. The air tanks may continuously provide fluid. The air tanks may maintain a constant fluid pressure to the air bags. For example, as the linear motors move the armature more air may flow from the air tank into the air bags so that once the linear motor ceases to lift the armature the air bag and corresponding air tank may maintain the armature in a lifted position. The air tank may comprise a finite amount of air so that a volume of air between the air tank and the air bag is predetermined. The air tank may comprise a compressor that fills the air tank if the pressure in the air tank falls below a predetermined amount. The air tank may comprise a compressible fluid. The air tank may comprise a non-compressible fluid. One air tank may supply multiple air bags. Each air bag may be in communication with a single air tank. The air tanks may be located within the voids. The air bags may include an upper chamber and a lower chamber and the upper chamber, the lower chamber or both may extend partially or entirely within the air tank when the air tank, the air bag, or both are off.

The lower chamber functions to connect to the air tank. The lower chamber may be static. The lower chamber may move relative to a top of the air tank. The lower chamber may have a cross-sectional thickness that is substantially identical to the air tank. The lower chamber may fixedly connect to the air tank. The lower chamber may extend into the air tank. The lower chamber may extend partially or fully into the air tank. The lower chamber may house all or a portion of the upper chamber. The upper chamber may move relative to the lower chamber.

The upper chamber may move within the lower chamber when a fluid is moved into the lower chamber, the air bags, or both. The upper chamber may be an upper portion of air bag. The upper chamber may be the moving portion of air bag. The upper chamber may move to lift an armature, a corner of a vehicle, or both. The upper chamber may extend from being partially of fully located within the air tank, the lower chamber, or both. The upper chamber may move or be moved. The upper chamber may be connected to the lower chamber and the lower chamber may be connected to the air tank (or storage tank) via an air bag cap, an air tank cap, or both.

The air bag cap may seal a bottom of the lower air bag chamber. The air bag cap may form a seal with the air tank cap. The air bag cap may prevent fluid from exiting the lower chamber and the storage tank, the lower chamber and the air tank cap, or both. The air bag cap may be made of or include rubber, an elastomer, metal, plastic, a pliable material, a malleable material, an elastically deformable material, a plastically deformable material, or a combination thereof. The air bag cap may be a metal over molded with a pliable material. The air bag cap may mate with the air tank cap.

The air tank cap may function to form a seal between the storage tank and the air bag cap, the storage tank and the lower chamber, or both. The air tank cap may have a complementary fit to the air bag cap. The air tank cap may be made of or include the same materials as the air bag cap. The air tank cap may permit the lower chamber to move relative to the storage tank. The air tank cap and air bag cap may permit movement of the lower chamber and the storage tank. The air tank cap may connect to a top of the storage tank.

The storage tank functions to store fluid. The storage tank may be the air tank. The storage tank may be a tank that holds extra fluid. The storage tank may hold a sufficient amount of air to move the upper chamber, the lower chamber, or both. The upper chamber, the lower chamber, or both may move a lifting distance and the storage tank may supply the fluid to move the upper chamber, the lower chamber, or both the lifting distance. The storage tank may hold a predetermined amount of air. The storage tank may receive fluid as the fluid exits the storage tank. The storage tank may have a cross-sectional thickness is substantially a same cross-sectional thickness as the void. The storage tank may hold about 0.5 L or more, about 1 L or more, about 2 L or more, about 5 L or more, about 10 L or more of a fluid. The storage tank may hold about 100 L of or less, about 75 L or for less, about 50 L or less, or about 25 L or less. The storage tank may connect to the air bag at a first end and a reducer at a second end.

The reducer functions to connect the storage tank to a stand. The reducer may have a first end that connects to the storage tank and a second end that connects to a stand. The first end may have a cross-sectional thickness that is a same size as the second end of the storage tank. The reducer may receive fluid from a fluid source, an air compressor, a fluid compressor, or a combination thereof. The reducer may provide a sufficient amount of fluid pressure to move the air bag, the upper chamber of the air bag, or both. The reducer may connect the lifting assembly to a stand.

The stand may connect a lifting assembly with a void of the armature. The stand may connect the lifting assembly to the base portion. The stand may form a removable connection with the base portion. The stand may prevent the lifting assembly from moving with the armature when the armature is moved by the linear motor. The stand may include recesses to connect the lifting assembly to the base portion via one or more fasteners that extend through the recesses. The stand may ensure that the lifting assembly is axially aligned with the void through armature. The stand may prevent movement of the air tank when the air bags (e.g., upper chamber and/or lower chamber) move. The stand may be a base of the lifting assembly, a base of the reducer, or both. The stand may be a monolithic part of the reducer. The stand may be connected to the reducer.

FIG. 1A illustrates an isometric view of a first side of the linear actuator assembly 100. The linear actuator assembly 100 includes a base portion 102 that connects the linear actuator assembly 100 to a structure such as a floor, a stand, a movable platform, or a combination thereof. The base portion 102 may immovably connect the linear actuator assembly 100 so that as a lifting portion 104 moves, the linear actuator assembly 100 is retained within a predetermined position. All or a portion of the lifting portion 104 may move in and out of the base portion 102. The base portion 102 may further include a vent hole 106 that provides a cooling fluid (not shown) into the base portion 102. The vent hole 106 may move the fluid to assist in cooling the linear motors 108.

The linear motors 108 function to move the lifting portions 104 of the linear actuator assembly 100 so that the linear actuator assembly 100 may be used to test a vehicle (not shown). A linear motor 108 may be located on opposing sides of the linear actuator assembly 100. One of the linear motors 108 are located on opposing sides of an armature 150 within the linear actuator assembly 100. The armature 150 may move so that a lifting plate 110 moves relative to the base portion 102. The armature 150 may support or be moved by lifting assemblies 170 located therein.

Figure 1B:
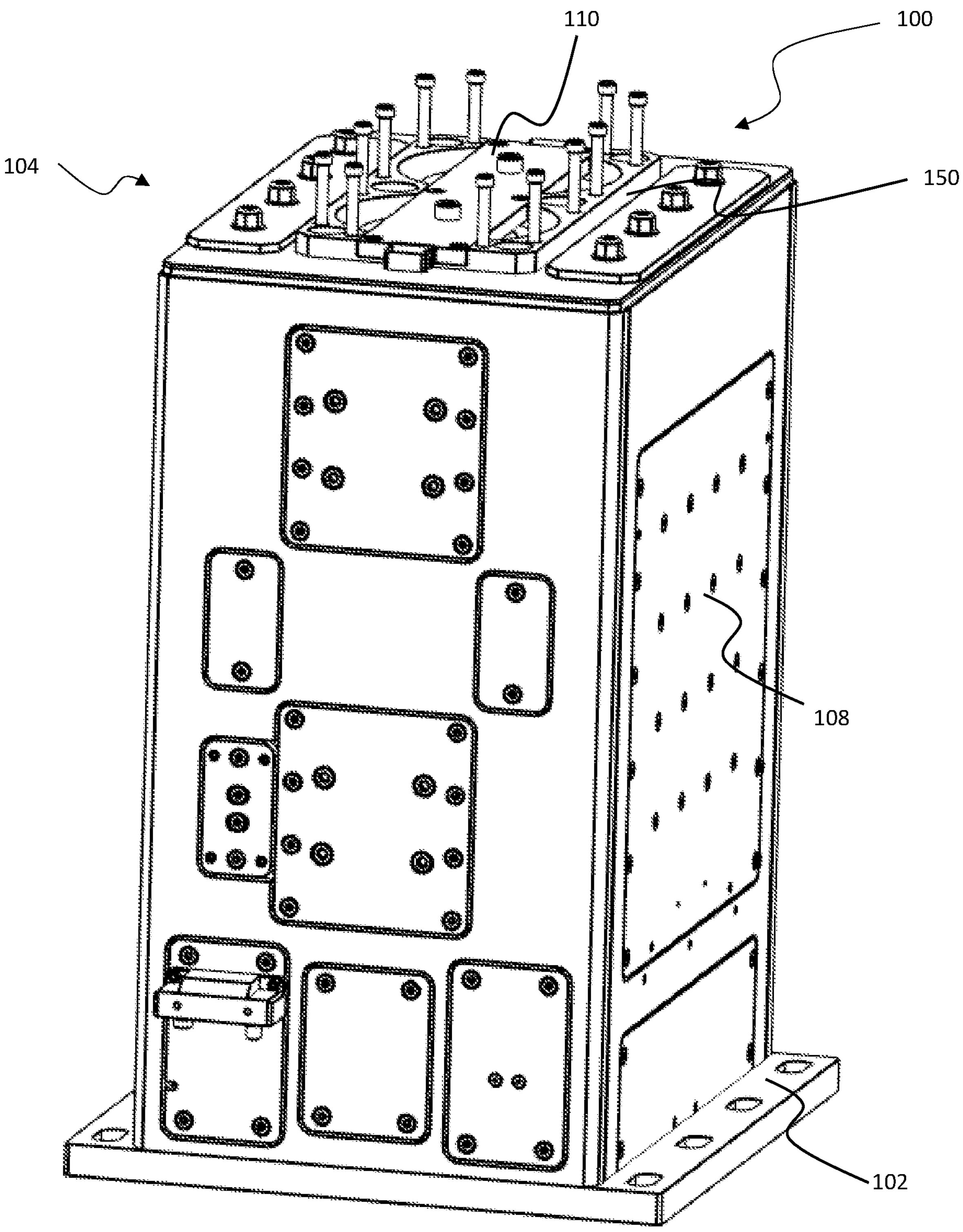
FIG. 1B is an isometric view of a second side of a linear actuator assembly of FIG. 1A.

FIG. 1B is an isometric view of the linear actuator assembly 100. The linear actuator assembly 100 includes a base 102 that connects the linear actuator assembly 100 to a foundation. The base 102 retains the linear actuator assembly 100 in place so that the lifting portion 104 is movable to lift one corner of a vehicle (not shown). As the lifting portion 104 moves, the lifting plate 110 is moved. The lifting plate 110 is connected to a top of the armature 150.

Figure 2A:
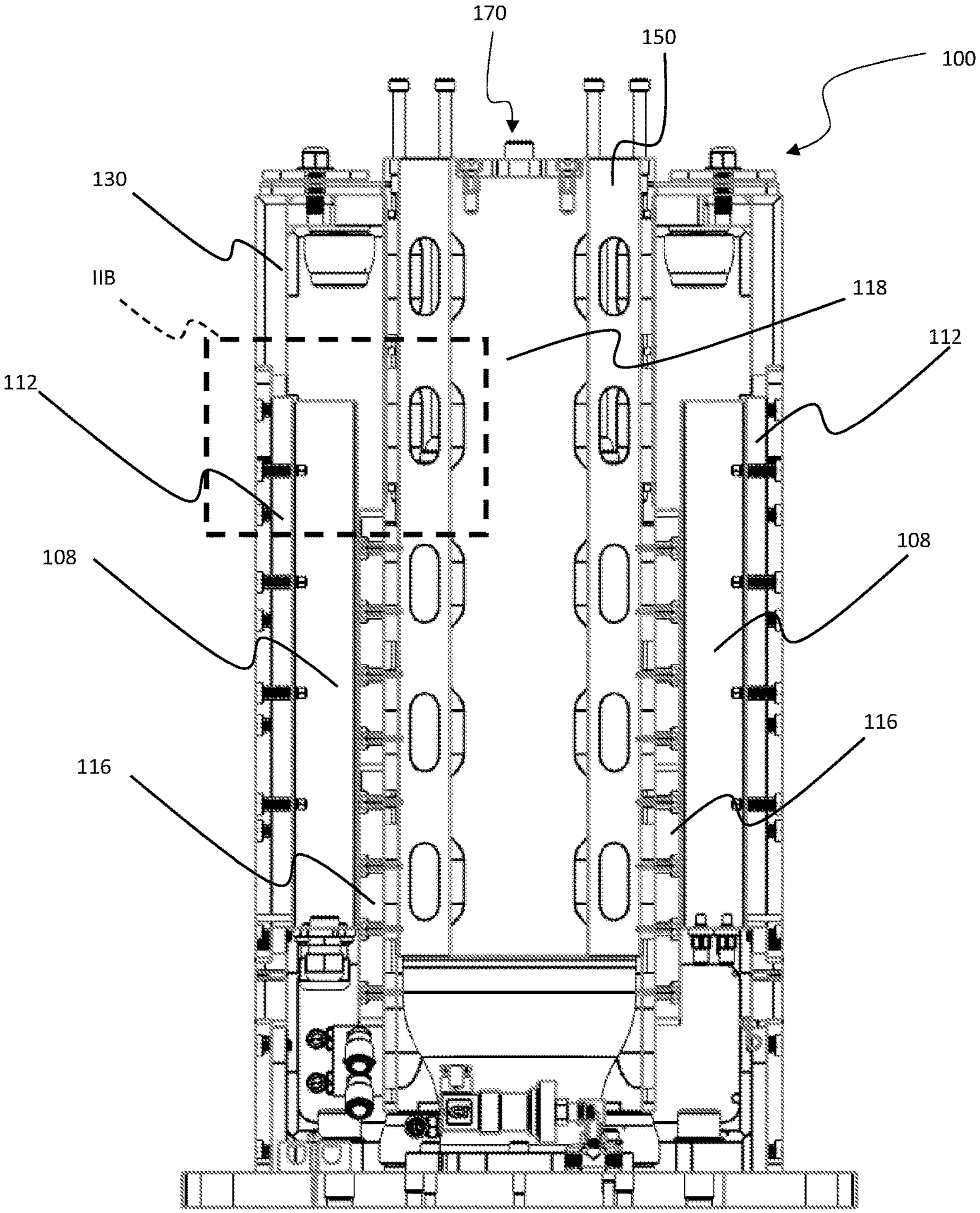
FIG. 2A is a cross-sectional view of the linear actuator assembly of FIG. 1A along lines IIA-IIA.

FIG. 2A is a cross-sectional view of the linear actuator assembly 100 of FIG. 1A along lines IIA-IIA. The linear actuator assembly 100 includes an armature 150 that extends through a center. The armature 150 has voids 118 therein that receive the lifting assemblies 170. Magnets 116 are connected to a first side and a second side of the armature 150. The magnets 116 are located opposite linear motors 108 that are connected to an actuator frame 130 via mounting plates 112. The mounting plates 112 and the linear motors 108 are connected to the actuator frame 130 so that the actuator frame 130 restricts movement of the linear motors 108 and causes movement of the magnets 116 and armature 150.

Figure 2B:
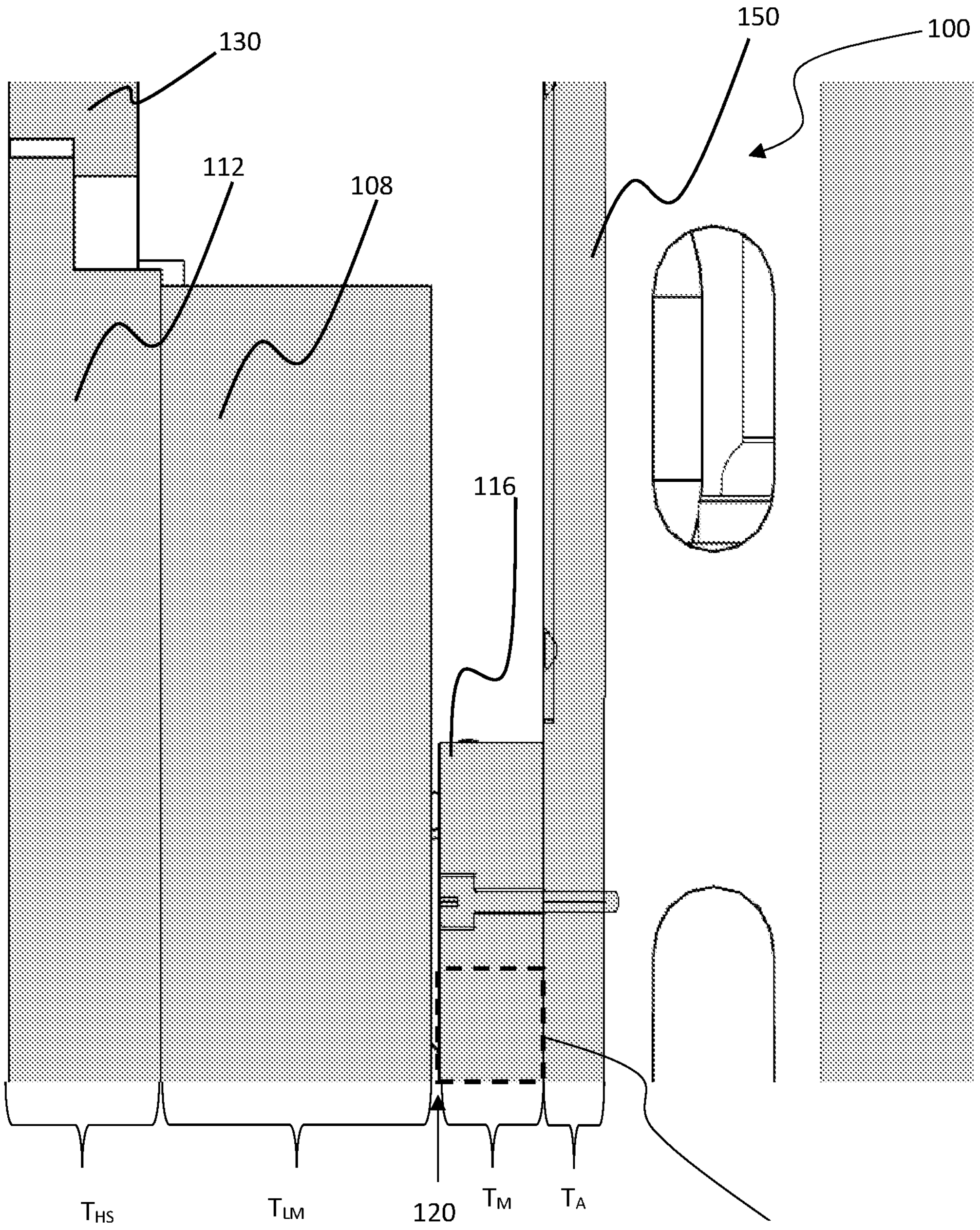
FIG. 2B is a close-up view of area IIB in FIG. 2A.

FIG. 2B is a close-up view of one side of the linear actuator assembly 100. Mounting plates 112 form an outside of the linear actuator assembly 100 and are connected to an actuator frame 130. Linear motors 108 are in communication with the mounting plates 112. The mounting plates 112 have a thickness of $T_{HS}$ and the linear motors 108 have a thickness of $T_{LM}$. A magnet 116 is in communication with an armature 150. An air gap 120 extends between the magnet 116 and the linear motor 108 so that the magnets 116 and armature 150 are movable relative to and by the linear motor 108. The magnet 116 has a thickness $T_M$. The thickness $T_M$ is less than both the thickness $T_{HS}$ and $T_{LM}$.

Figure 2C:
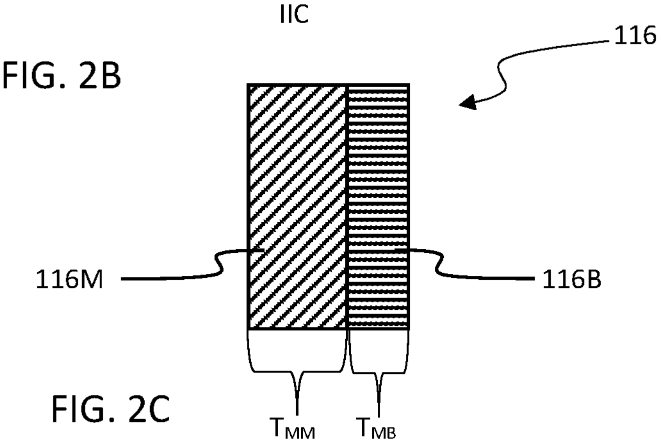
FIG. 2C is a close-up view of area IIC in FIG. 2B.

FIG. 2C is a close-up cross-sectional view of the magnet 116. The magnet 116 includes a portion that is a magnetic material 116M and a portion that is a magnetic backing 116B. The magnetic material 116M has a thickness $T_{MM}$ and the magnetic backing 116B has a thickness $T_{MB}$. The thickness of the magnetic material 116M is greater than the thickness of the magnetic backing 116B.

Figure 3:
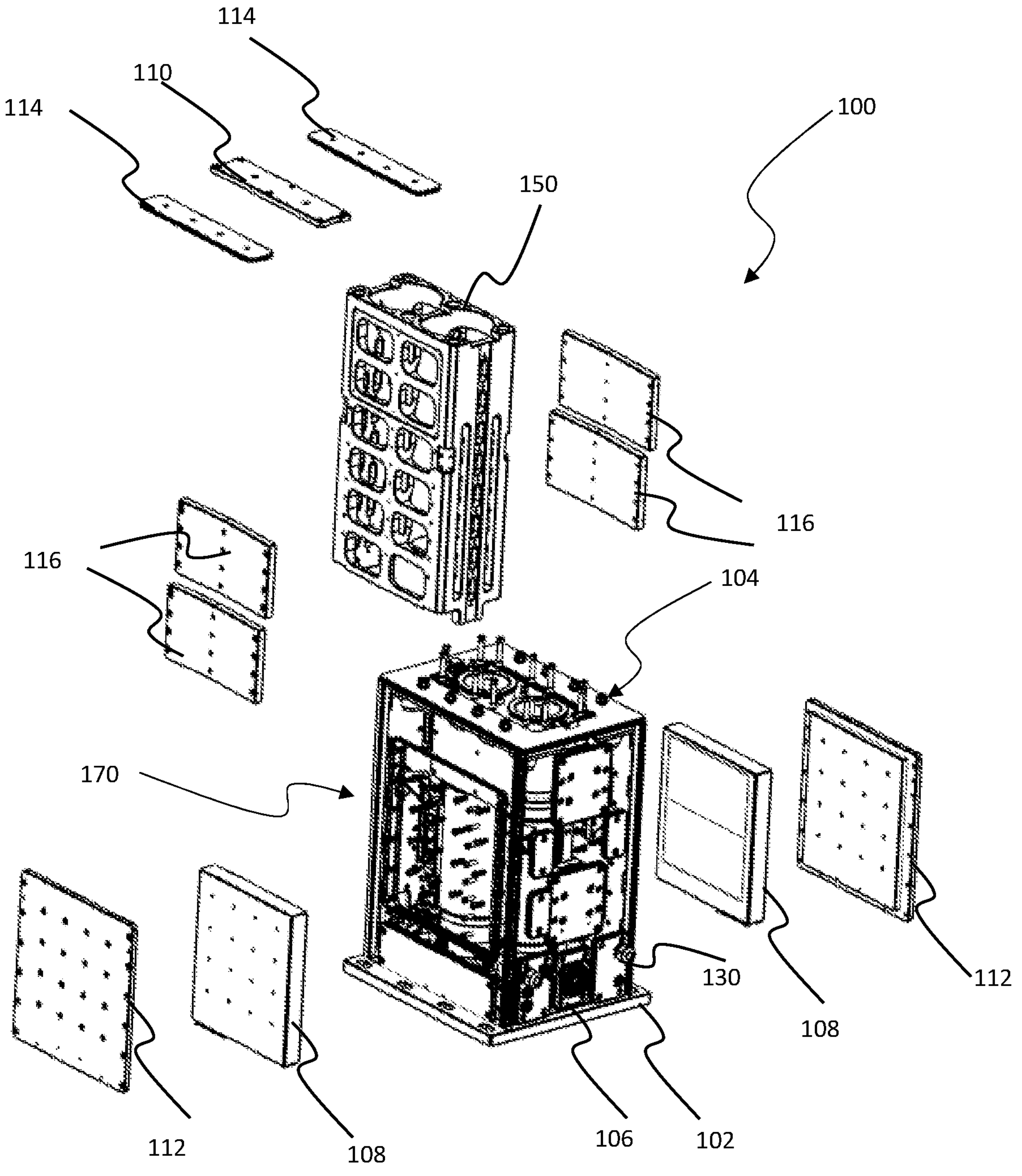
FIG. 3 is a partially exploded view of the linear actuator assembly of FIG. 1A.

FIG. 3 is a partially exploded view of the linear actuator assembly 100. The actuator assembly 100 includes the actuator frame 130 that includes a base portion 102, a lifting portion 104, and a vent hole 106. The lifting assembly 170 is shown within the actuator frame 130 with the armature 150 removed. The linear motors 108 and mounting plates 112 are spaced apart from the actuator frame 130 to expose the lifting assembly 170. A pair of magnets 116 extend from each side of the armature 150. The lifting plate 110 is removed from the armature 150 and connection plates are removed from a top of the actuator frame 130. The armature 150 is movable in and out of the actuator frame 130 to move a corner of a vehicle (not shown).

Figure 4:
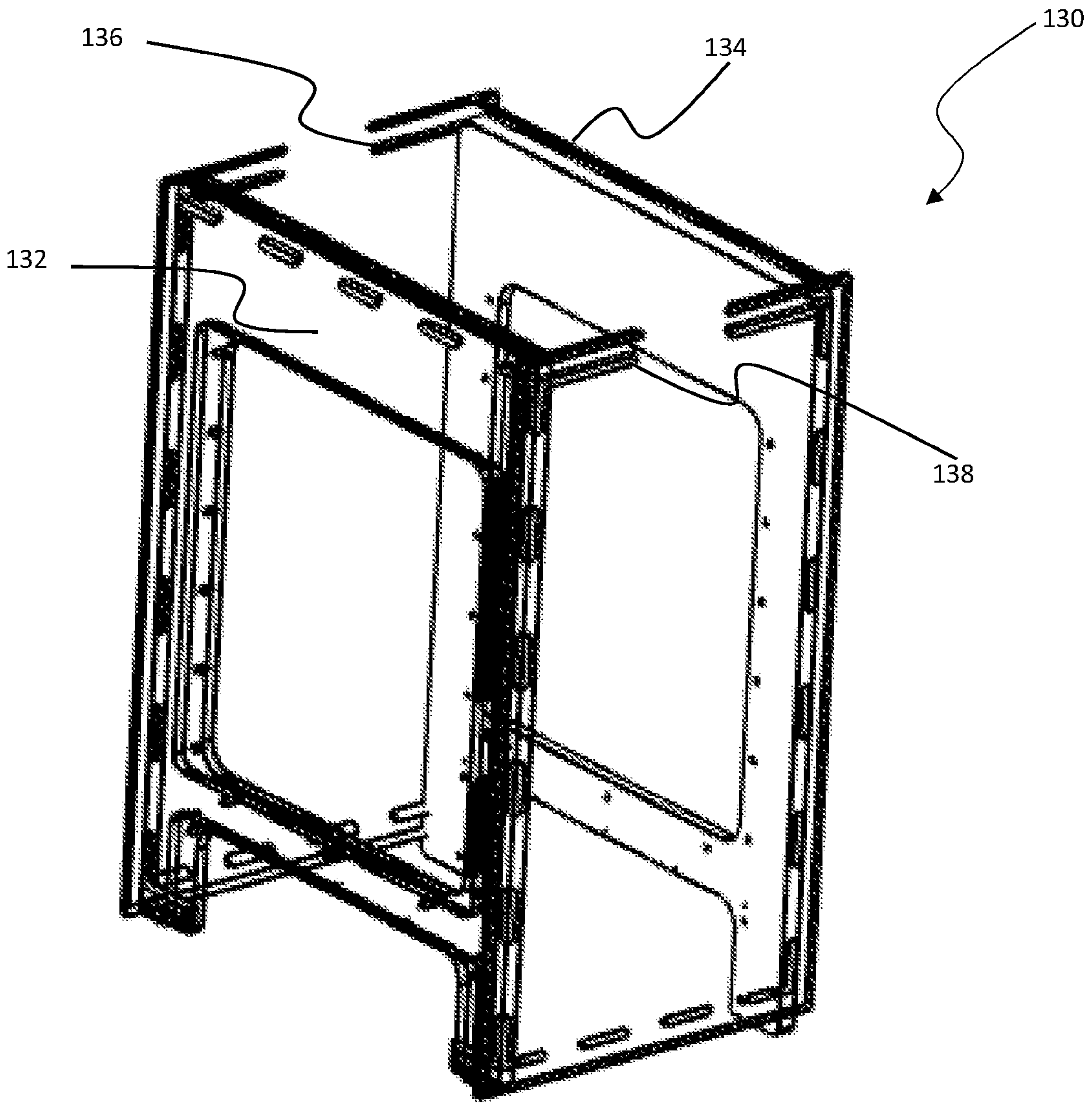
FIG. 4 is an isometric view of an actuator frame of the linear actuator assembly of FIG. 1A.

FIG. 4 depicts an isometric view of only the actuator frame 130. The actuator frame 130 includes a first side 132, a second side 134, a third side 136, and a fourth side 138. As shown, the third side 136 and the fourth side 138 are not a continuous piece but the third side 136 and the fourth side 138 may be continuous pieces.

Figure 5:
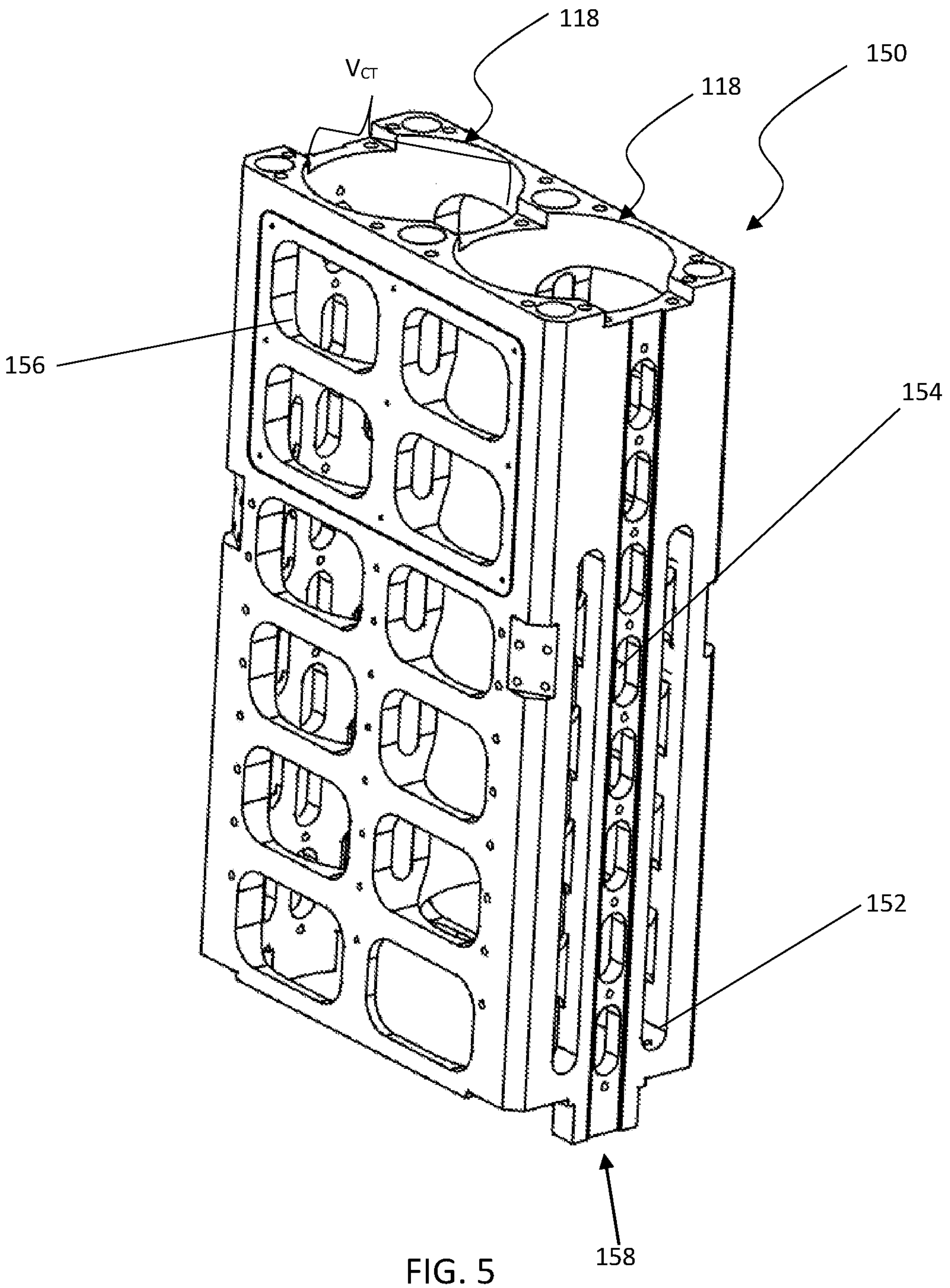
FIG. 5 is an isometric view of an armature of the linear actuator assembly of FIG. 1A.

FIG. 5 depicts an isometric view of the armature 150. The armature 150 includes a pair of voids 118 that extends there along, in a longitude direction, an axial direction, or both. The voids 118 include a cross-sectional thickness ($V_{CT}$). The sides of the armature 150 include travel stops 152 with a bearing rail 154 extending between the travel stops 152. A bottom of the armature 150 includes one or more ears 158 that may assist in connecting the armature 160 to the actuator frame 130 of FIG. 4.

Figure 6A:
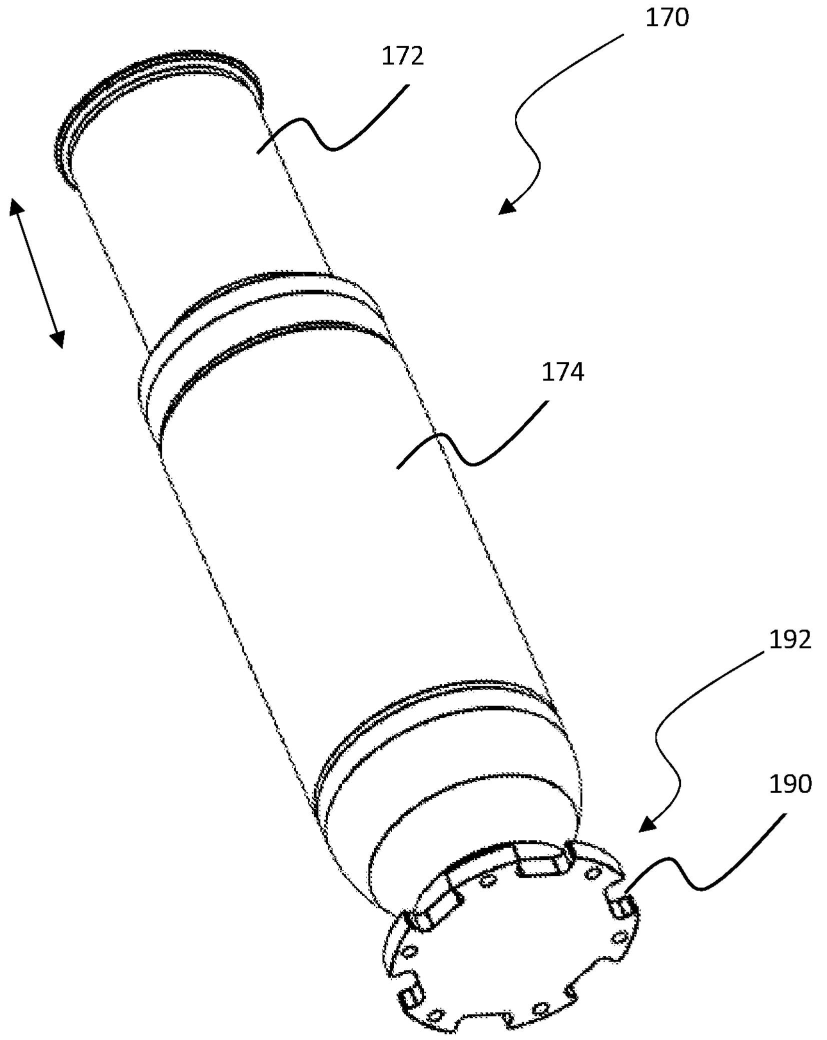
FIG. 6A is an isometric view of a lifting assembly.

FIG. 6A is an isometric view of a lifting assembly 170. The lifting assembly 170 includes an air bag 172 that is moved by an air tank 174 supplying a fluid into the air bag 172. The lifting assembly 170 includes a stand 190 at its base. The stand 190 may be solid or include cutouts 192 as shown.

Figure 6B:
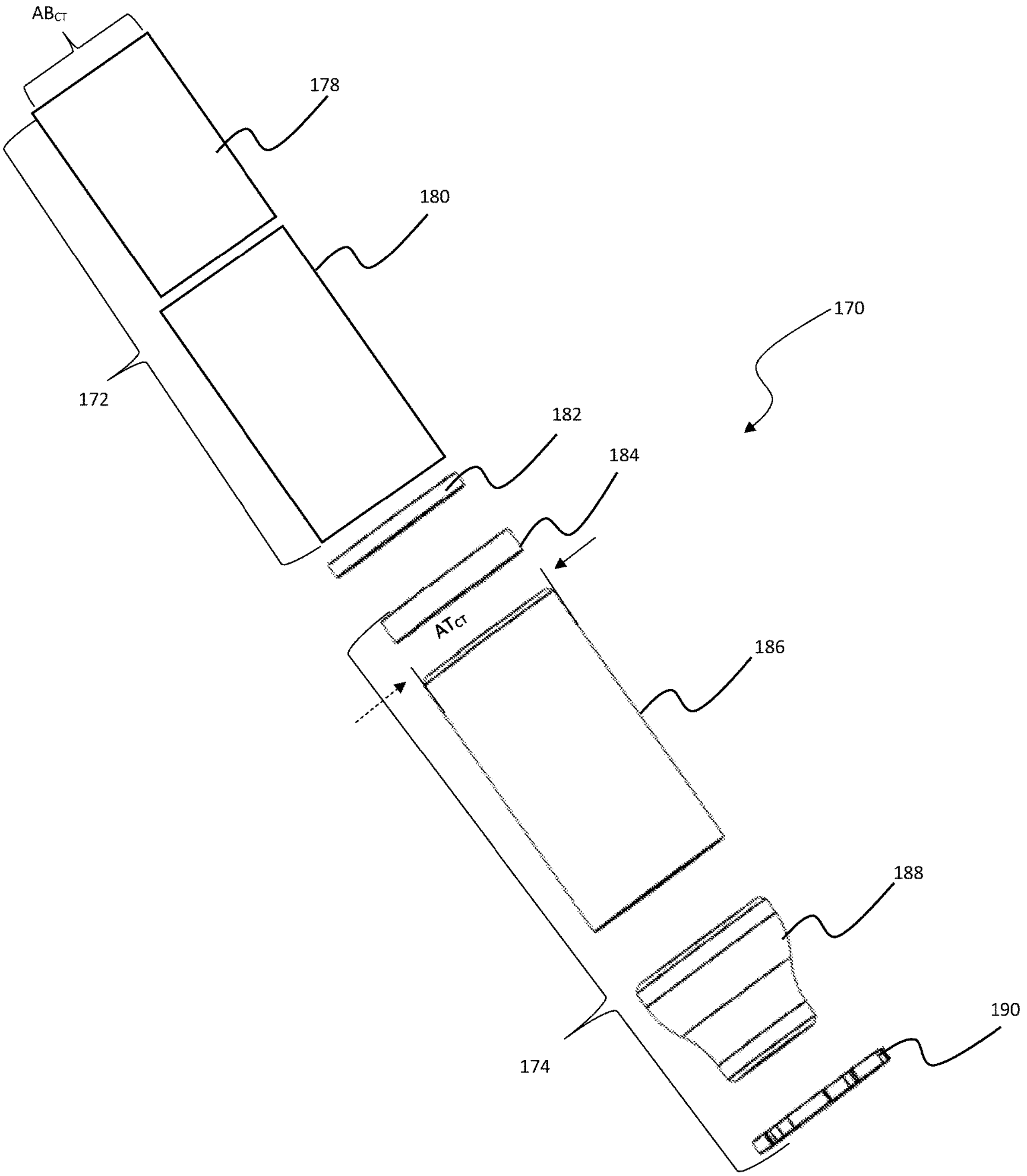
FIG. 6B is an exploded view of a lifting assembly.

FIG. 6B is an exploded view of a lifting assembly 170. The air bag 172 and the air tank 174 of the lifting assembly 170 may be made of multiple parts. The air bag 172 includes an upper air bag chamber 178 and a lower air bag chamber 180. The air tank 174 includes a storage tank 186, a reducer 188, and a stand 190. An air bag cap 182 and an air tank cap 184 fluidly connect the air bag 172 and the air tank 174. A plurality of seals (not shown) may prevent fluid from leaking out of the lifting assembly 170. The air bag 172 includes a cross-sectional thickness ($AB_{CT}$). The air tank 174 includes a cross-sectional thickness ($AT_{CT}$). The cross-sectional thickness ($AB_{CT}$) of the air bag 172 may be smaller than the cross-sectional thickness ($AT_{CT}$) of the air tank 174, although very close in size.

Figure 7:
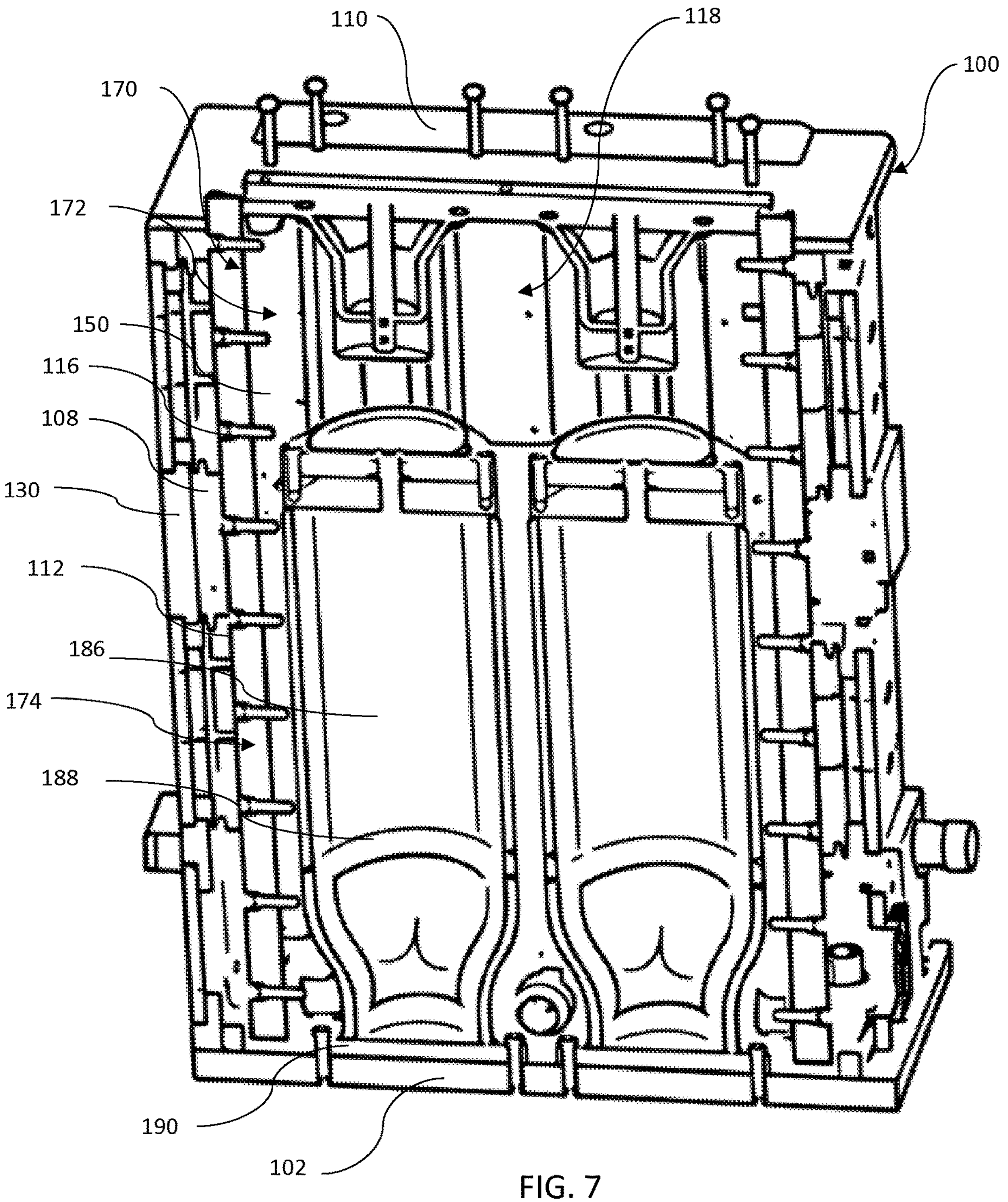
FIG. 7 is a cross-sectional view of FIG. 1A along line VII-VII.

FIG. 7 is a cross-sectional view of the linear actuator assembly 100. The linear actuator assembly 100 includes a base portion 102 that fixedly connects the linear actuator assembly 100 to a structure or foundation. Mounting plates 112 are connected to an actuator frame 130. Linear motors 108 are connected to an interior of the actuator frame 130. The linear motors 108 are located across from magnets 116. The magnets 116 are connected to an armature 150. When the linear motors 108 are activated the magnets 116 move the armature 150 and a lifting plate 110 to lift a corner of a vehicle (not shown).

Inside of the armature 150 are voids 118. The voids 118 house lifting assemblies 170. The lifting assemblies 170 include air bags 172 and air tanks 174 that are movable relative to one another. The air tanks 174 include a storage tank 186 and reducer 188. The lifting assemblies 170 are connected to the base portion 102 by a stand 190 so that the air tank 174 is fixed within the linear actuator assembly 100.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

100 Linear Actuator Assembly
102 Base Portion
104 Lifting Portion
106 Vent Hole
108 Linear Motor
110 Lifting Plate
112 Mounting Plate or Motor Mounting Plate
114 Connection Plate
116 Magnet
118 Void
120 Air Gap
116M Magnetic Material
116B Magnetic Backing
VCT Void Cross-Sectional Thickness
THS Thickness Heat Sink
TLM Thickness Linear Motor
TM Thickness Magnet
TMM Thickness Magnetic Material
TMB Thickness Magnetic Backing
130 Actuator Frame
132 First Side
134 Second Side
136 Third Side
138 Fourth Side
150 Armature
152 Travel Stop
154 Bearing Rail
156 Window
158 Ear
170 Lifting Assembly
172 Air Bag
174 Air Tank
178 Upper Air Bag Chamber
180 Lower air Bag Chamber
182 Air Bag Cap
184 Air Tank Cap
186 Storage Tank
188 Reducer
190 Stand

We claim:

1. A linear actuator assembly comprising:
an actuator frame;
an armature located within the actuator frame, the armature having a first side and a second side;
one or more lifting assemblies located within the armature;
magnets comprising:
a magnetic material that generates a magnetic field, the magnetic material comprising a magnetic material thickness, and
magnetic backing connected to the magnetic material, the magnetic backing comprising a magnetic backing thickness, wherein the magnets further comprise:
one or more first magnets connected to the first side of the armature, and
one or more second magnets connected to the second side of the armature;
a first linear motor located on the first side of the armature and spaced apart from the one or more first magnets by a first air gap; and
a second linear motor located on the second side of the armature and spaced apart from the one or more second magnets by a second air gap; and
wherein ratio of the magnetic backing thickness to the magnetic material thickness is about 2:1 or less; and
wherein the armature, the one or more first magnets, and the one or more second magnets are moved relative to the actuator frame by the first linear motor and the second linear motor.

2. The linear actuator assembly of claim 1, wherein the ratio of the magnetic backing thickness to the magnetic material thickness is about 1.4:1 or less.

3. The linear actuator assembly of claim 1, further comprising a first mounting plate on the first side in communication with the actuator frame and a second mounting plate on the second side in communication with the actuator frame.

4. The linear actuator assembly of claim 1, wherein the one or more lifting assemblies include one or more air bags and one or more air tanks.

5. The linear actuator assembly of claim 4, wherein the one or more air bags lift the armature and a vehicle located above the armature to carry a static load.

6. The linear actuator assembly of claim 5, wherein the first linear motor and the second linear motor provide a dynamic force to the armature and the vehicle so that the armature and the vehicle are moved along an axis that extends through the one or more lifting assemblies.

7. The linear actuator assembly of claim 1, wherein the armature includes two or more voids and each of the two or more voids include one of the one or more lifting assemblies.

8. The linear actuator assembly of claim 7, wherein each of the two or more voids include a cross-sectional thickness and one or more air tanks include a cross-sectional thickness, with the cross-sectional thickness of the one or more air tanks being substantially equal to the cross-sectional thickness of the one or more voids, and wherein the one or more air tanks fit within the two or more voids of the armature.

9. The linear actuator assembly of claim 8, wherein the two or more voids have a longitudinal axis and each of one or more air bags axially move along the longitudinal axis.

10. The linear actuator assembly of claim 7, wherein each of the two or more voids include a cross-sectional thickness and one or more air bags include a cross-sectional thickness, with the cross-sectional thickness of the one or more air bags being substantially equal to the cross-sectional thickness of the one or more voids, and wherein one of the one or more air bags movably fit within each the two or more voids of the armature.

11. The linear actuator assembly of claim 10, wherein a lifting plate extends over the one or more air bags located within the two or more voids so that as the one or more air bags axially move the lifting plate to distribute a load therebetween.

12. A linear actuator assembly comprising:

an actuator frame;

an armature located within the actuator frame, the armature comprising:

a first side;

a second side; and one or more voids having a cross-sectional thickness;

a first linear motor connected to the first side of the armature;

a second linear motor connected to the second side of the armature; and a lifting assembly located within the one or more voids, the lifting assembly comprising:

an air tank, and an air bag connected to and located axially above the air tank, wherein the air bag movably fits within the one or more voids and the air bag has a cross-sectional thickness that is substantially equal to the cross-sectional thickness of the one or more voids.

13. The linear actuator assembly of claim 12, wherein a cross-sectional thickness of the air tank and the air bag are substantially equal.

14. The linear actuator assembly of claim 12, wherein the air bag enlarges in an axial direction when a fluid is introduced into the air bag and the cross-sectional thickness remains substantially constant.

15. The linear actuator assembly of claim 12, wherein the one or more voids are two voids and each of the two voids includes one of the lifting assembly, and the two voids extend through a central portion of the armature.

16. The linear actuator assembly of claim 12, wherein the first linear motor and the second linear motor are connected to the actuator frame and move the armature relative to the actuator frame.

17. The linear actuator assembly of claim 12, wherein a first magnet is connected to the first side of the armature and is spaced apart from the first linear motor by a first air gap.

18. The linear actuator assembly of claim 17, wherein a second magnet is connected to the second side of the armature and is spaced apart from the second linear motor by a second air gap.

19. The linear actuator assembly of claim 18, wherein the first magnet and the second magnet each comprise:

a magnetic material that generates a magnetic field, the magnetic material comprising a magnetic material thickness, magnetic backing connected to the magnetic material, the magnetic backing comprising a magnetic backing thickness, and wherein the magnetic backing thickness is less than the magnetic material thickness.

20. The linear actuator assembly of claim 12, wherein the one or more voids are two or more voids and each of the two or more voids include one of the lifting assemblies.

* * * * *